(12) United States Patent
Adimatyam et al.

(10) Patent No.: US 9,071,805 B2
(45) Date of Patent: Jun. 30, 2015

(54) SYSTEMS, METHODS, AND APPARATUSES FOR HANDLING FAILED MEDIA CONTENT RECORDINGS

(75) Inventors: Venkata S. Adimatyam, Irving, TX (US); Sameer Gavade, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1083 days.

(21) Appl. No.: 12/347,812

(22) Filed: Dec. 31, 2008

(65) Prior Publication Data

US 2010/0166384 A1 Jul. 1, 2010

(51) Int. Cl.
*H04N 5/76* (2006.01)
*H04N 9/80* (2006.01)
*H04N 21/4147* (2011.01)

(52) U.S. Cl.
CPC ............ *H04N 5/76* (2013.01); *H04N 21/4147* (2013.01)

(58) Field of Classification Search
USPC .................................................. 386/291–299
See application file for complete search history.

(56) References Cited

U.S. PATENT DOCUMENTS

| 6,721,954 | B1* | 4/2004 | Nickum ........................... 725/46 |
| 6,795,639 | B1* | 9/2004 | Lord ............................. 386/291 |
| 7,689,995 | B1* | 3/2010 | Francis et al. ................. 718/104 |
| 2004/0103434 | A1* | 5/2004 | Ellis ............................... 725/58 |
| 2008/0039034 | A1* | 2/2008 | Fujita et al. ................. 455/179.1 |
| 2008/0040750 | A1* | 2/2008 | Taylor et al. .................... 725/55 |
| 2008/0075423 | A1* | 3/2008 | DeBie ............................. 386/83 |
| 2009/0052870 | A1* | 2/2009 | Marsh et al. .................. 386/124 |
| 2009/0220208 | A1* | 9/2009 | Gustafson et al. ............... 386/83 |

* cited by examiner

Primary Examiner — Hung Dang

(57) ABSTRACT

An exemplary system includes a communication facility configured to receive transmitted data representative of a plurality of media content instances in accordance with a transmission schedule. The system further includes a media recording facility communicatively coupled to the communication facility. The media recording facility is configured to recognize a failure to record one of the media content instances, and designate the media content instance for consideration for at least one future recording opportunity. In certain embodiments, the designation of the media content instance includes adding at least one identifier representative of the media content instance to a watch list, searching program guide data for the identifier; and identifying, from the program guide data, a scheduled future transmission of the media content instance.

20 Claims, 9 Drawing Sheets

SYSTEMS, METHODS, AND APPARATUSES FOR HANDLING FAILED MEDIA CONTENT RECORDINGS

BACKGROUND INFORMATION

The set-top box ("STB") has become an important device for accessing media content services and the media content within those services. It is not uncommon for an STB to include or to be used in conjunction with digital video recording ("DVR") technology, which may be used to record media content to permanent storage (e.g., a hard disk) for subsequent local access.

A common problem experienced by users of traditional DVR technology is that of recording failures, which may have various causes. For example, a DVR device typically has limited resources for recording media content. Consequently, the DVR device can record only a limited number of media programs at one time. If a number of media programs scheduled for concurrent recording exceeds the recording resources of the DVR device, a recording conflict results. Typically, a recording conflict causes at least one of the conflicting media programs scheduled for recording to not be recorded.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

Exemplary systems, methods, and apparatuses for handling failed recordings of media content are disclosed herein. As described in more detail below, in certain examples a failure to record a media content instance may be recognized. The media content instance may be designated for consideration for at least one future recording opportunity. When a future recording opportunity (e.g., a scheduled future transmission of the media content instance) is identified, the media content instance may be scheduled for recording during the scheduled future transmission.

As an example, an exemplary system may include a communication facility configured to receive transmitted data representative of a plurality of media content instances in accordance with a transmission schedule. The system may further include a media recording facility communicatively coupled to the communication facility. The media recording facility may be configured to recognize a failure to record one of the media content instances, and designate the media content instance for consideration for at least one future recording opportunity. In certain embodiments, the designation of the media content instance includes adding at least one identifier representative of the media content instance to a watch list, searching program guide data for the identifier; and identifying, from the program guide data, a scheduled future transmission of the media content instance.

The term "media content instance" as used herein may refer generally to any television program, on-demand media program, pay-per-view media program, broadcast media program (e.g., broadcast television program), IPTV content, commercial, advertisement, video, movie, song, video game, image, photograph, sound, or any segment, component, or combination of these or other forms of media content that may be viewed or otherwise experienced by a user. In certain embodiments, a media content instance includes a television program that is configured to be transmitted (e.g., broadcast, multicast, or narrowcast) to at least one media content processing device during a scheduled transmission time period.

Components and functions of exemplary systems, methods, and apparatuses for handling failed recordings of media content will now be described in more detail.

Figure 1:
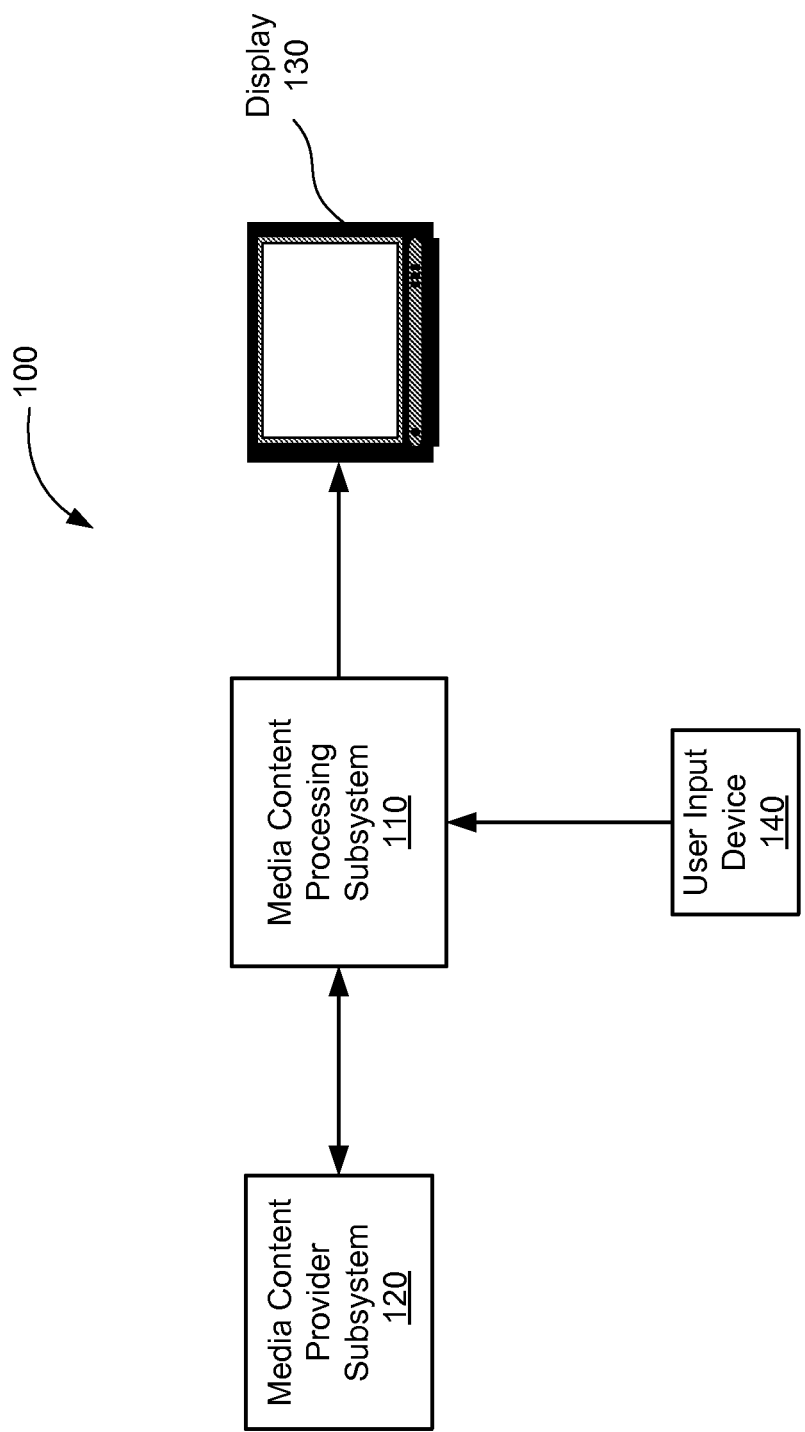
FIG. 1 illustrates an example of a media content access system.

FIG. 1 illustrates an exemplary media content access system 100 (or simply "system 100"). System 100 may include a media content processing subsystem 110, media content provider subsystem 120, display 130, and user input device 140 communicatively coupled to one another as shown in FIG. 1. Media content processing subsystem 110 may be configured to communicate with and receive a signal and/or data stream containing data representative of media content and/or program guide data from media content provider subsystem 120. Media content processing subsystem 110 and media content provider subsystem 120 may communicate using any suitable communication technologies, devices, networks, media, and protocols supportive of remote data communications.

Figure 2:
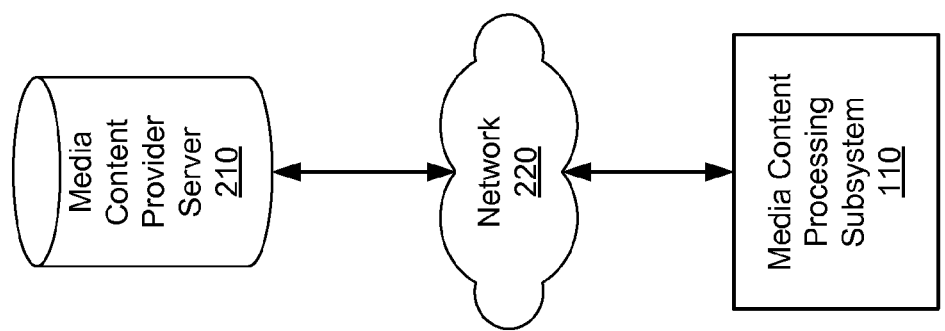
FIG. 2 illustrates an exemplary media content provider network.

For example, as shown in FIG. 2, media content provider subsystem 120 may include or be implemented on at least one media content provider server 210 configured to communicate with media content processing subsystem 110 over a network 220 (and communications links thereto). Network 220 may include one or more networks or types of networks capable of carrying communications and/or data signals between media content provider server 210 and media content processing subsystem 110. For example, network 220 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Media content processing subsystem 110 and media content provider server 210 may communicate over network 220 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

Returning to FIG. 1, media content processing subsystem 110 may be configured to process a media content stream received from media content provider subsystem 120. The processing may include causing media content included in the stream to be presented for experiencing (e.g., viewing) by a user. Presentation of the media content may include, but is not limited to, displaying, playing back, or otherwise presenting the media content, or one or more components of the media content, such that the media content may be experienced by the user. For example, media content processing subsystem 110 may provide one or more signals to display 130 (e.g., a television screen, computer monitor, etc.) such that the display 130 may present media content for experiencing by the user.

As shown in FIG. 1, and as will be described in more detail below, media content processing subsystem 110 may be at least partially controlled by user input device 140 (e.g., a remote control device). In certain examples, user input device 140 may include one or more input mechanisms by which a user may utilize and/or control features and/or services provided by media content processing subsystem 110.

Figure 3:
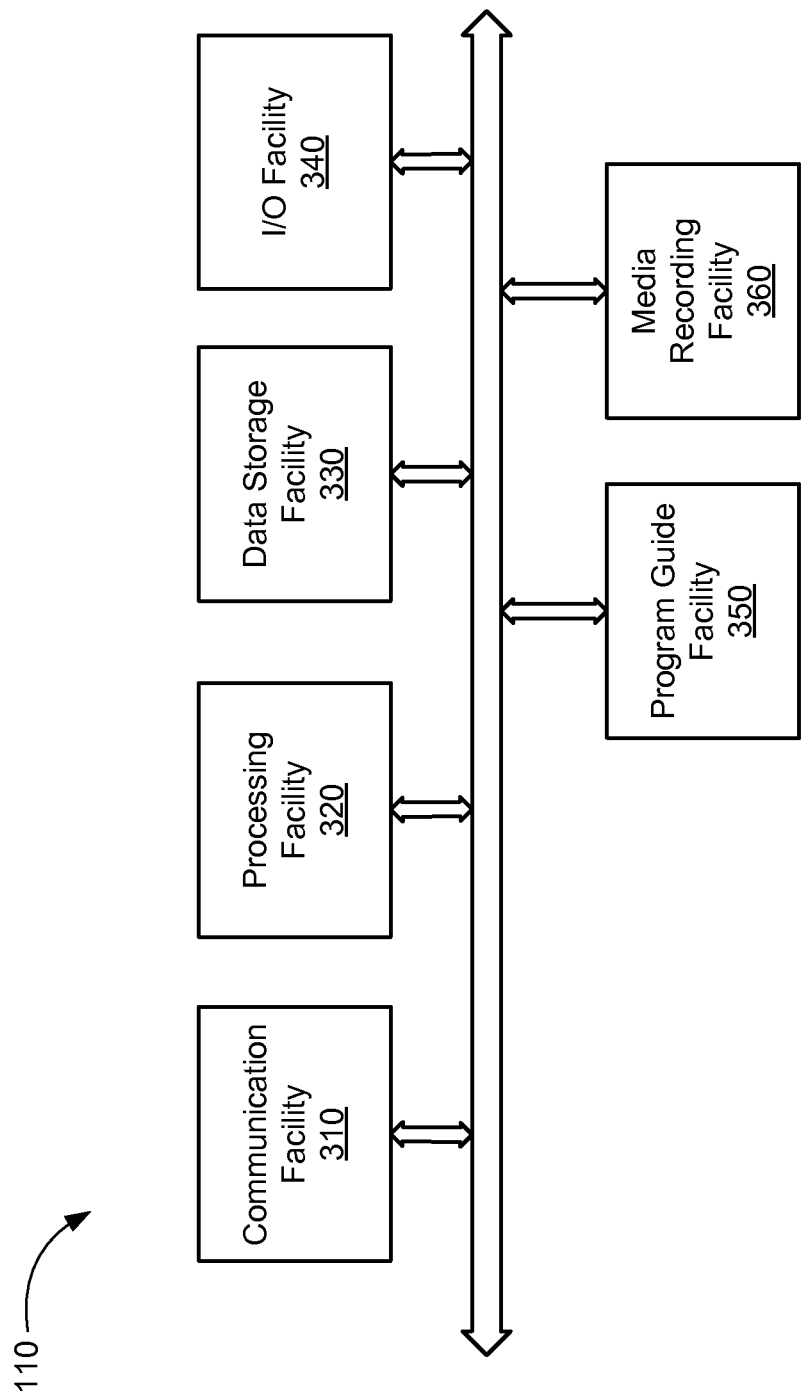
FIG. 3 illustrates an exemplary media content processing subsystem.

Exemplary components, features, operations, and implementations associated with media content processing subsystem 110 will now be described. FIG. 3 illustrates exemplary components of media content processing subsystem 110 (or simply "processing subsystem 110"). As shown in FIG. 3, processing subsystem 110 may include a communication facility 310, processing facility 320, data storage facility 330, input/output ("I/O") facility 340, program guide facility 350, and media recording facility 360. The components of system 100 may communicate with one another, including sending data to and receiving data from one another, using any suitable communication technologies.

In certain embodiments, processing subsystem 110 or one or more components of processing subsystem 110 may include any computer hardware and/or computer-implemented instructions (e.g., software), or combinations of computer-implemented instructions and hardware, configured to perform one or more of the processes described herein. In particular, it should be understood that processing subsystem 110 may be implemented on one physical computing device or may be implemented on more than one physical computing device. Accordingly, processing subsystem 110 may include any one of a number of computing devices, and may employ any one of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the components illustrated in FIG. 3 are not intended to be limiting. Additional or alternative components may be used in other embodiments. Components of the processing subsystem 110 shown in FIG. 3 will now be described in additional detail.

Communication facility 310 may be configured to communicate with one or more external devices, including one or more external sources of media content. In particular, communication facility 310 may be configured to communicate with media content provider subsystem 120, including sending and/or receiving communications signals, content, and/or data to/from media content provider subsystem 120. For example, communication facility 310 may be configured to receive transmitted data representative of media content in any acceptable format from media content provider subsystem 120. The media content may include one or more media content instances.

Typically, media content provider subsystem 120 may transmit (e.g., broadcast, multicast, or narrowcast) one or more data streams containing data representative of one or more media content instances. Communication facility 310 may receive such data streams such that the data representative of the media content instances contained therein may be processed by processing subsystem 110. To this end, communication facility 310 may include any device, logic, and/or other technologies suitable for receiving signals, data streams, and/or data representative of media content. Communication facility 310 may be configured to interface with any suitable communication media, protocols, and formats, including any of those mentioned above.

In certain embodiments, media content provider subsystem 120 may be configured to transmit and processing subsystem 110 may be configured to receive data streams or signals including data representative of various media content instances in accordance with a transmission schedule. The transmission schedule may specify that particular media content instances are to be transmitted at scheduled transmission times and on certain content carrier channels. As used herein, the term "scheduled transmission time" or "scheduled transmission" may refer generally to any period of time during which a media content instance is to be transmitted to processing subsystem 110. The term "content carrier channel" or "content channel" as used herein may refer generally to any carrier of media content, including, but not limited to, media (e.g., television) channels, streams, addresses, frequencies or other carriers of media content.

Communication facility 310 may be configured to selectively identify, receive, and/or process appropriate data streams and/or media content instances at the scheduled transmission times and on the appropriate content carrier channels. For instance, in certain implementations communication facility 310 may include a tuner configured to selectively receive media content carried on a particular content carrier channel. The tuner may be tuned to a particular content carrier channel such that the content carried on the content carrier channel is received and may be processed by processing subsystem 110.

In some examples, communication facility 310 may include multiple tuners such that content carried on different content carrier channels may be concurrently received for processing by the processing subsystem 110. For example, communication facility 310 may include a first tuner configured to receive content carried on an analog video signal and a second tuner configured to concurrently receive content carried on a digital compressed signal.

While one or more tuners may be used to receive various types of content-carrying signals transmitted by media content provider subsystem 120, additionally or alternatively, communication facility 310 may be configured to receive other types of signals (e.g., other types of media content carrying signals) from media content provider subsystem 120 and/or one or more other sources without using a tuner. For example, media content provider subsystem 120 may transmit digital streams of data packets (e.g., Internet Protocol ("IP") based data packets) that can be received without using a tuner. For such types of signals, communication facility 310 may receive and forward the signals directly to other components of processing subsystem 110 (e.g., processing facility 320) without the signals going through a tuner. For an IP-based signal, for example, communication facility 310 may function as an IP receiver.

Processing facility 320 may include one or more processors and may be configured to execute and/or direct execution of one or more of the processes or operations described herein. Processing facility 320 may direct execution of operations in accordance with computer-executable instructions such as may be stored in data storage facility 330 or another computer-readable medium. As an example, processing facility 320 may be configured to process data, including demodulating, decoding, and parsing acquired data (e.g., data representative of media content received from media content provider subsystem 120 by communication facility 310), and encoding and modulating data for transmission by communication facility 310.

Data storage facility 330 may include one or more data storage media, devices, or configurations and may employ any type, form, and combination of data storage media and/or device. For example, data storage facility 330 may include, but is not limited to, a hard drive, network drive, flash drive, magnetic disc, optical disc, random access memory ("RAM"), dynamic RAM ("DRAM"), other non-volatile and/or volatile data storage units, or a combination or subcombination thereof. Electronic data, including data described herein (e.g., media content data, program guide data, and recording data), may be temporarily and/or permanently stored in data storage facility 330.

I/O facility 340 may be configured to receive user input and provide user output and may include any hardware, firmware, software, or combination thereof supportive of input and output capabilities. For example, I/O facility 340 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O facility 340 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O facility 340 is configured to provide graphical data to display 130 for presentation to a user. Exemplary graphical user interfaces ("GUIs") and GUI views that may be displayed by display 130 are described further below.

Program guide facility 350 may be configured to maintain and operate on program guide data. As mentioned above, media content instances may be transmitted by media content provider subsystem 120 at scheduled transmission times and on certain content carrier channels. To assist processing subsystem 110 and/or a user of processing subsystem 110 with reception of media content instances at appropriate scheduled transmission times and on appropriate content carrier channels, program guide data may be received by communication facility 310 from media content provider subsystem 120 and/or from another source. The program guide data may be stored in data storage facility 330.

The program guide data may include information descriptive of a media content transmission schedule, including information descriptive of content carrier channels, scheduled transmission times (e.g., programming time slots), media content instances, metadata for the media content instances, and relationships between the content channels, transmission times, and media content instances. In certain embodiments, the program guide data received and stored by processing subsystem 110 is descriptive of a media content transmission schedule covering a certain period of time (e.g., a twenty-four hour period, a week, two weeks, or a month). Accordingly, processing subsystem 110 may be configured to periodically receive at least one update to the program guide data (i.e., updated program guide data) that is descriptive of a transmission schedule for a new period of time. For example, processing subsystem 110 may be configured to receive updated program guide data on a daily basis (e.g., at a certain off-peak time each night).

Program guide facility 350 may be configured to arrange and provide graphical data representative of a program guide view to I/O facility 340 for inclusion in a GUI. I/O facility 340 may generate and provide a GUI including the program guide view to display 130 for presentation to a user. A program guide view may include a graphical arrangement of program guide data, one or more program guide tools (e.g., program guide navigation, search, and/or filter tools), one or more graphical selectors for navigating and highlighting selectable options, and/or other graphics. Typically, a program guide view presents at least a portion of a media content transmission schedule to a user. The user may utilize the program guide view to access information about media content instances and scheduled transmission times and channels associated with the media content instances.

Media recording facility 360 may be configured to record data representative of media content to data storage facility 330. The recording of a media content instance is typically performed during a transmission time slot when data representative of the media content instance is received from media content provider subsystem 120 as described above. For example, during transmission of a media content instance from media content provider subsystem 120 to processing device 110 on a content carrier channel, communication facility 310 may receive data representative of the media content instance on the content carrier channel, and media recording facility 360 may direct that the received data representative of the media content instance be stored to data storage facility 330. Once stored, the data representative the media content instance may be accessed and processed as may suit a particular application, including providing data representative of the media content instance to display 130 for presentation to a user.

Media recording facility 360 may be configured to schedule recordings of data representative of media content instances. Typically, media recording facility 360 is configured to schedule recordings based on a media content transmission schedule, which may be represented by program guide data. As an example, media recording facility 360 may schedule a recording of a media content instance. When a scheduled transmission time for the media content instance arrives, media recording facility 360 may initiate a recording of the media content instance on an appropriate content carrier channel associated with the scheduled transmission of the media content instance.

Media recording facility 360 may be configured to maintain a schedule of one or more recordings, which schedule may be referred to as a "recording schedule." The recording schedule, or entries included in the recording schedule, may be created in response to user input (e.g., a user selecting a media content instance to be recorded) or automatically by media recording facility 360 in response to a predetermined event. These and additional features of media recording facility 360 are described in additional detail further below.

Figure 4:
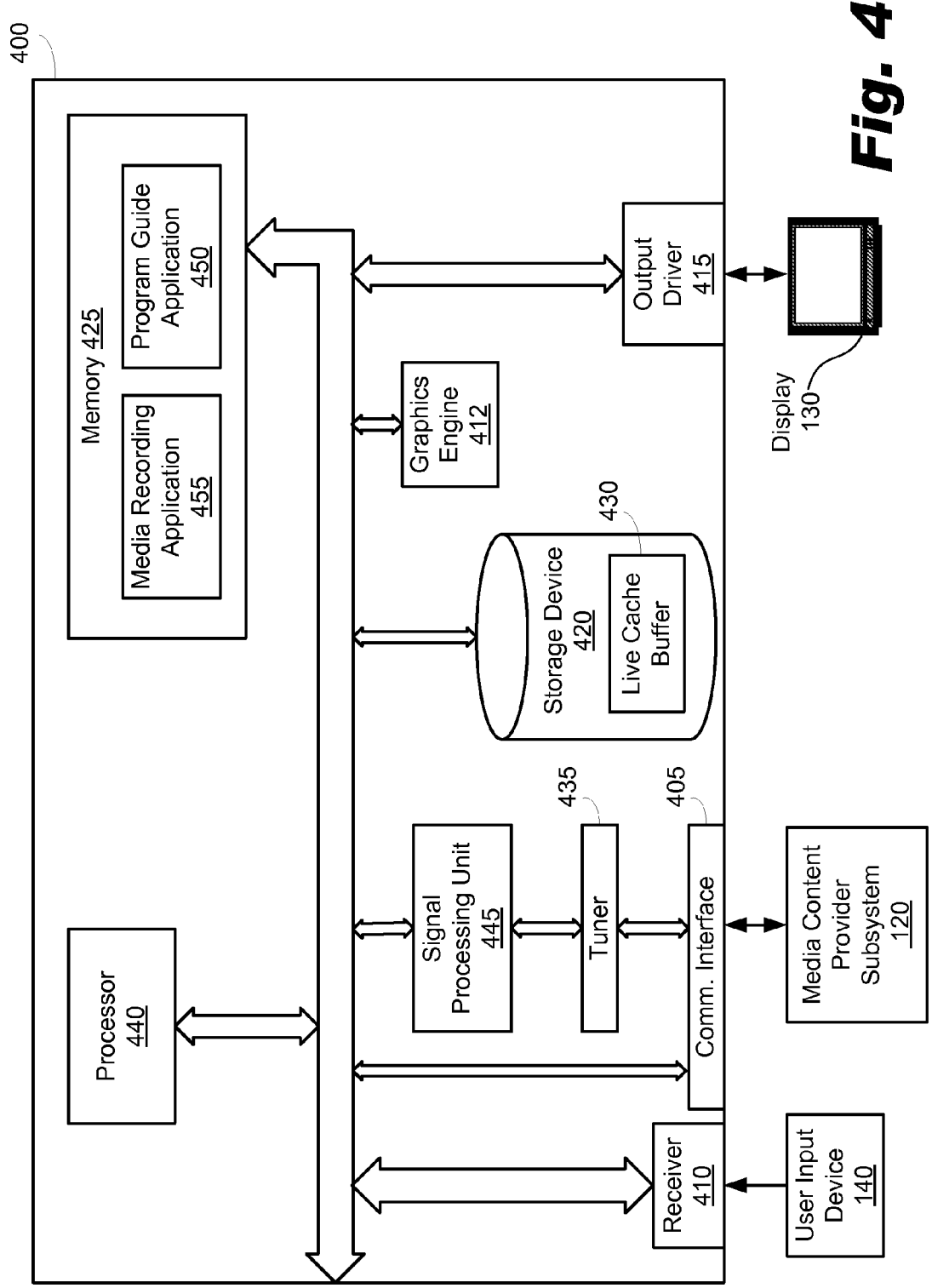
FIG. 4 illustrates an exemplary device implementation of the media content processing subsystem of FIG. 3.

Processing subsystem 110 and/or components of processing subsystem 110 may be implemented as may suit a particular application. FIG. 4 illustrates an exemplary device 400 having processing subsystem 110 implemented thereon. Device 400 may include one or more of the components of processing subsystem 110 shown in FIG. 3 and may be configured to perform one or more of the processes and/or operations described herein. Device 400 may include, but is not limited to, a media content processing device, communications device, mobile device (e.g., a mobile phone device), handheld device, personal computer, phone device (e.g., Verizon Hub device), personal-digital assistant device, set-top box, gaming device, digital video recording ("DVR") device (e.g., a personal video recording ("PVR") device), a television device, and/or any device configured to perform one or more of the processes and/or operations described herein.

As shown in FIG. 4, device 400 may include a communication interface 405 configured to receive content (e.g., media content) and/or data (e.g., program guide data) in any acceptable format from media content provider subsystem 120 or from any other suitable external source. Communication interface 405 may include any device, logic, and/or other technologies suitable for receiving signals and/or data representative of media content and/or other types of content or data. Communication interface 405 may be configured to interface with any suitable communication media, protocols, and formats, including any of those mentioned above.

Device 400 may also include a receiver 410 configured to receive user input signals from user input device 140. User input device 140 may include, for example, a remote control device or any other suitable input device and may be configured to communicate with receiver 410 via a wireless link, electrical connection, or any other suitable communication link.

Figure 5:
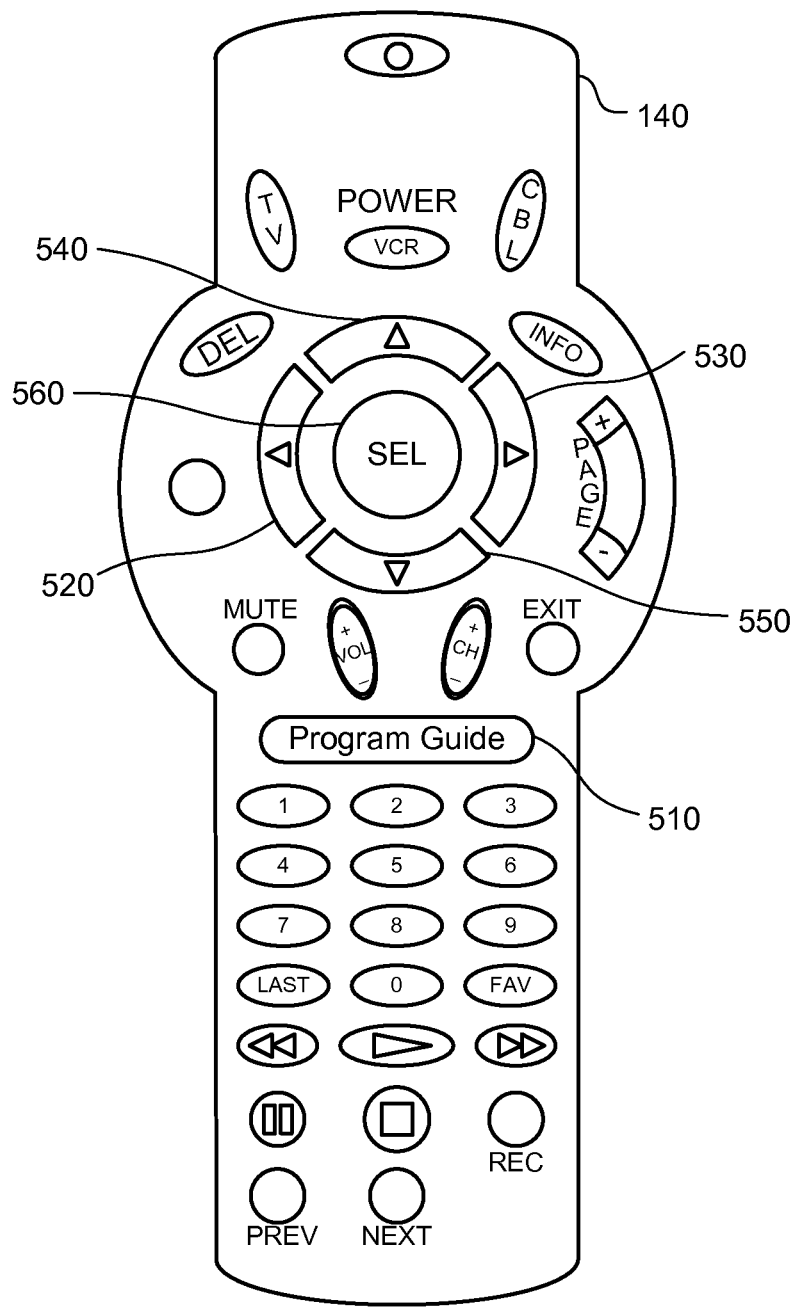
FIG. 5 illustrates an exemplary remote control user input device.

An exemplary remote control user input device 140 is illustrated in FIG. 5. In some examples, input device 140 may be configured to facilitate a user controlling operations of processing subsystem 110, including controlling options for experiencing media content, viewing program guide data, and scheduling recordings of media content. For instance, a program guide button 510 may be configured to evoke a presentation of a program guide GUI on display 130. A left button 520, right button 530, up button 540, down button 550, and select button 560 may be included and configured to facilitate a user evoking and/or navigating through various views, options, and GUIs displayed by display 130. Input device 140 shown in FIG. 5 is merely illustrative of one of the many different types of user input devices that may be used to provide input commands to processing subsystem 110.

Returning to FIG. 4, device 400 may include a graphics engine 412 and an output driver 415. Graphics engine 412 may be configured to generate graphics to be provided to output driver 415, which may be configured to interface with or drive display 130. Output driver 415 may provide output signals to display 130, the output signals including graphical content (e.g., media content and/or program guide content) generated by graphics engine 412 and to be presented by display 130 for experiencing by a user. For example, output driver 415 may provide a data representative of a GUI including a program guide view to display 130 for presentation to the user. Graphics engine 412 and output driver 415 may include any combination of hardware, software, and/or firmware as may serve a particular application.

Storage device 420 may include one or more data storage media, devices, or configurations and may employ any type, form, and combination of storage media. For example, storage device 420 may include, but is not limited to, a hard drive, network drive, flash drive, magnetic disc, optical disc, or other non-volatile storage unit. Media content, program guide data, and other data may be temporarily and/or permanently stored in storage device 420.

Storage device 420 is shown to be a part of the device 400 in FIG. 4 for illustrative purposes only. It will be understood that storage device 420 may additionally or alternatively be located external of device 400.

Storage device 420 may include one or more live cache buffers 430. Live cache buffer 430 may additionally or alternatively reside in memory 425 or in a storage device external to device 400. In some examples, media content data may be temporarily stored in live cache buffer 430 to facilitate viewing and/or recording of the media content.

Device 400 may include memory 425. Memory 425 may include, but is not limited to, FLASH memory, random access memory ("RAM"), dynamic RAM ("DRAM"), other suitable computer-readable media, or any combination or sub-combination thereof. In some examples, one or more applications configured to run on device 400 may reside in memory 425.

Device 400 may include one or more tuners 435. As described above, tuner 435 may be configured to selectively receive media content carried on a particular content carrier channel such that the media content may be processed by device 400. In some examples, media content received by tuner 435 may be temporarily buffered, or stored, in the live cache buffer 430. If there are multiple tuners 435, there may be a live cache buffer 430 corresponding to each of the tuners 435.

While tuner 435 may be used to receive certain content-carrying signals transmitted by media content provider subsystem 120, device 400 may be configured to receive other types of content signals (including media content signals and/or program guide data signals) from media content provider subsystem 120 and/or one or more other sources without using a tuner. For example, media content provider subsystem 120 may transmit digital streams of data packets (e.g., Internet Protocol ("IP") based data packets) that can be received without using a tuner. For such types of content signals, communication interface 405 may receive and forward the signals directly to other components of device 400 (e.g., processor 440 or signal processing unit 445) without the signals going through tuner 435. For an IP-based signal, for example, signal processing unit 445 may function as an IP receiver.

Device 400 may include at least one processor, such as processor 440, configured to control and/or perform one or more operations of device 400. Device 400 may also include a signal processing unit 445 configured to process incoming media content. Signal processing unit 445 may be configured, for example, to demodulate and parse encoded digital media content. In some examples, device 400 may include one or more signal processing units 445 corresponding to each of the tuners 435.

Device 400 may include one or more applications (e.g., software applications) residing in memory 425 or another computer-readable medium and configured to be executed by processor 440 of device 400. In FIG. 4, device 400 includes a program guide application 450 and a media recording application 455 residing in memory 425. Program guide application 450 may be configured to perform or direct one or more other components of device 400 to perform one or more of the program guide operations described herein. Media recording application 455 may be configured to perform or direct one or more other components of device 400 to perform one or more of the media recording related operations described herein. In certain embodiments, program guide facility 350 may be implemented in device 400 as program guide application 450, and media recording facility 360 may be implemented in device 400 as media recording application 455.

As mentioned above, media recording facility 360 may be configured to maintain a schedule of media content recordings. The schedule may include data representative of one or more media content instances or series of media content instances scheduled for recording, one or more time slots during which the media content instances are scheduled to be recorded, and one or more content carrier channels on which the media content instances are scheduled to be received for recording.

In certain examples, a recording of a media content instance may fail to be performed. Such an event may be referred to as a "media content recording failure" or a "recording failure." As used herein, a recording failure may include any failure to successfully initiate or complete a recording of a media content instance. As an example, a media content instance may be scheduled to be recorded during a particular time slot on a particular content channel, but the media content instance may not be successfully recorded as scheduled.

A recording failure may occur for any of a number of various reasons. Examples of such reasons may include, but are not limited to, lack of a communication connection between processing subsystem 110 and media content provider subsystem 120, lack of a media content signal from media content provider subsystem 120, unavailability of a content carrier channel, lack of power to processing subsystem 110, lack of resources in processing subsystem 110 (e.g., data storage facility 330 is full or otherwise lacks resources or there are too few tuners to handle concurrent recordings), and a user-initiated cancellation of a scheduled recording. Additional reasons for recording failures are described further below.

Media recording facility 360 may be configured to recognize a failure to record a media content instance and to perform one or more actions based on a recording failure. For example, a particular media content instance scheduled for recording may fail to be recorded. Media recording facility 360 may be configured to recognize the failed recording and to designate the media content instance for consideration for at least one future recording opportunity. As used herein, a future recording opportunity may include a scheduled future transmission of the same media content instance from media content provider subsystem 120 to processing subsystem 110. The scheduled future transmission of the media content instance may be on the same content carrier channel associated with the originally scheduled recording or on another content carrier channel accessible to media recording facility 360.

In certain embodiments, designation of the media content instance for consideration for at least one future recording opportunity by media recording facility 360 may include media recording facility 360 identifying the media content instance as being associated with a failed recording and adding at least one identifier representative of the media content instance to a watch list. The watch list may comprise any record maintained by media recording facility 360. The identifier may include any data useful for identifying the media content instance. Examples of such an identifier may include, but are not limited to, a unique identifier for the media content instance maintained by system 100, a title of the media content instance, a description of the media content instance, and a combination or sub-combination of any of the above identifiers. In certain examples, media recording facility 360 may be configured to access one or more identifiers for the media content instance from metadata associated with the media content instance. As described above, such metadata may be included in program guide data maintained by program guide facility 350.

While the identifier is included in the watch list, media recording facility 360 may be configured to search for at least one future opportunity to record the media content instance. In certain embodiments, media recording facility 360 may search program guide data maintained by program guide facility 350 for data matching the identifier. Program guide data matching the identifier may be associated with a scheduled future transmission of the media content instance, which may be a future opportunity to record the media content instance.

In certain embodiments, the searching of program guide data may include periodic searching of program guide data for a future scheduled transmission of the media content instance. While the identifier of the media content instance is included in the watch list, the searching may be repeated periodically at least until a future opportunity to record the media content instance (e.g., a scheduled future transmission of the media content instance) is identified.

As described above, program guide facility 350 may maintain program guide data covering a certain period of time, and updated program guide data covering other periods of time may be periodically received by processing subsystem 110. In certain examples, media recording facility 360 may be configured to search locally stored program guide data at least once following each update of the program guide data locally stored on processing subsystem 110. In such examples, a search may be performed in response to a receipt of an update to program guide data. As an example, if program guide data is updated daily, a search for an identifier associated with the media content instance may also be performed daily using the updated program guide data.

If a suitable match is not found in a search of program guide data, the identifier associated with the media content instance may remain on the watch list. Accordingly, another search of program guide data for a future opportunity to record the media content instance may be performed. This may allow for periodic searching of program guide data for the identifier, including searching after updated program guide data is received. This process may be repeated each time updated program guide data is received and as long as the identifier associated with the media content instance remains on the watch list.

Any suitable search strategy may be used to search the program guide data. To this end, media recording facility 360 may include a search heuristic specifying a search strategy to be employed. In certain embodiments, for example, media recording facility 360 may be configured to search forward in time beginning with media content instances scheduled for transmission during a certain time slot and progressively moving forward in time by time slot. Other search strategies may be used in other embodiments.

Media recording facility 360 may be configured to perform one or more actions when a search of program guide data for the identifier locates one or more matches. For example, where multiple matches are found, media recording facility 360 may optionally sort the matches based on one or more attributes of the matches. In certain examples, the matches may be sorted by time, with transmissions of the media content instance scheduled for the near future being preferred over transmissions scheduled further into the future. Media recording facility 360 may then consider the matches in a particular order, which may be an order of preference.

Media recording facility 360 may identify from a match whether the match is associated with a future opportunity to record the media content instance. For example, media recording facility 360 may determine whether a match is associated with a scheduled future transmission of the media content instance. Accordingly, media recording facility 360 may identify a scheduled future transmission of the media content instance.

In certain embodiments, media recording facility 360 may be configured to schedule a recording of the media content instance. The recording may be scheduled to be performed during an identified scheduled future transmission of the media content instance. In certain examples, this may be referred to as a rescheduling of the media content instance for recording. The scheduling may be accomplished in any suitable way. For example, data representative (e.g., an identifier) of the scheduled recording may be added to a recording schedule. After the recording of the media content instance has been scheduled for a scheduled future transmission, an identifier associated with the media content instance may be removed from the watch list so that media recording facility 360 does not continue to search for other future opportunities to record the media content instance.

In certain embodiments, media recording facility 360 may be configured to check for availability of sufficient media content processing subsystem resources for recording the media content instance during the scheduled future transmission of the media content instance. Such a check may be performed before scheduling the media content instance for recording during the scheduled future transmission time. The check may be accomplished in any suitable way. For example, media recording facility 360 may check whether any scheduled recordings overlap with the scheduled future transmission time and compare any overlapping scheduled recordings with the available resources.

The above-described designation by media recording facility 360 of a media content instance for consideration for at least one future recording opportunity may be provided as a feature by media recording facility 360. This feature may be referred to as a "designation feature." Media recording facility 360 may be configured to invoke the designation feature in response to any suitable predefined event. In certain embodiments, for example, media recording facility 360 may be configured to automatically invoke the designation feature in response to a failed recording of a media content instance. In other embodiments, media recording facility 360 may be configured to make the designation feature available as a user-selectable option in response to a failed recording and to invoke the designation feature in response to a user selection of the option. In yet other embodiments, media recording facility 360 may be configured to selectively choose whether to automatically invoke the designation feature in response to a failed recording to wait for user input before invoking the designation feature.

Figure 6:
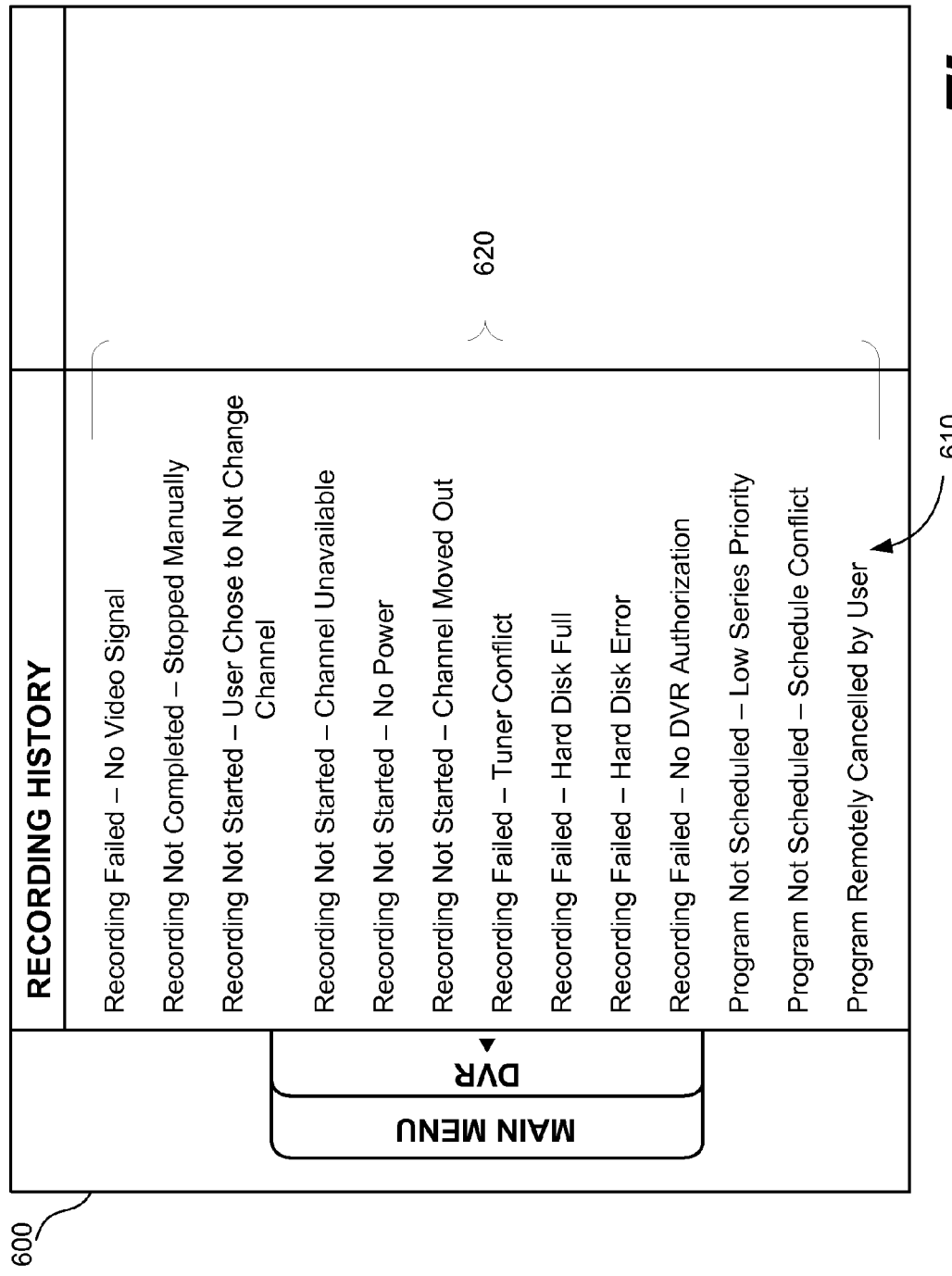
FIG. 6 illustrates a graphical user interface ("GUI") including an exemplary recording history log displayed therein.

As an example of a user-selectable designation feature, media recording facility 360 may be configured to provide a user selectable option associated with the designation feature within a context of a recording history log. Such a log may be generated and/or maintained by media recording facility 360 and may include data representative of one or more media recording events. FIG. 6 illustrates a GUI 600 that may be provided by processing subsystem 110 for display and may include an exemplary recording history log 610 displayed therein. As shown in FIG. 6, the recording history log 610 may include a plurality of entries 620. Each of the entries 620 may include data descriptive of a media recording event and/or a reason for a media recording event. An entry 620 may represent a failed recording and may provide a reason for the failed recording. For illustrative purposes, the recording history log 610 in FIG. 6 shows examples of recording failure events and reasons for the recording failures. When media recording facility 360 recognizes a recording failure, data representative of the recording failure may be added to the recording history log 610.

Events 620 in the recording history log 610 may be associated with various sources. For example, a user may cancel or stop a recording in various ways such as providing input directly to processing subsystem 110 or remotely by logging into system 100 using a remotely located access device such as a mobile phone or personal computer. Hence, events 620 may include events initiated locally by or at processing subsystem 100 and events initiated remotely by a user utilizing an access device. In certain embodiments, recording history log 610 may include information descriptive of an initiator (e.g., processing subsystem 110, a user, and/or a remote device such as a mobile phone or personal computer) associated with one or more of the events 620. For example, the entry 620 at the bottom of history log 610 indicates a program that was remotely canceled by a user.

Recording failures may be classified by type. In certain embodiments, for example, recording failures may include user-caused types of failures and system-caused types of failures. In FIG. 6, log 610 includes entries representative of recording events of distinct types, such as user-caused and system-caused recording events. For example, a user-caused recording event may include a recording that was manually stopped or canceled by a user. A system-caused recording event may include a recording that was not performed due to lack of resources (e.g., tuner conflict, lack of hard disk space, etc.).

Media recording facility 360 may be configured to identify a recording event type associated with a recording failure and to selectively perform one or more actions based on the recording event type. For example, media recording facility 360 may be configured to perform a particular action in response to a user-caused recording failure and a different action in response to a system-caused recording failure. In certain embodiments, for instance, media recording facility 360 may be configured to automatically invoke the designation feature described above in response to a system-caused recording failure and to wait for a user selection of a designation feature option before invoking the designation feature for a user-caused recording failure.

Figure 7:
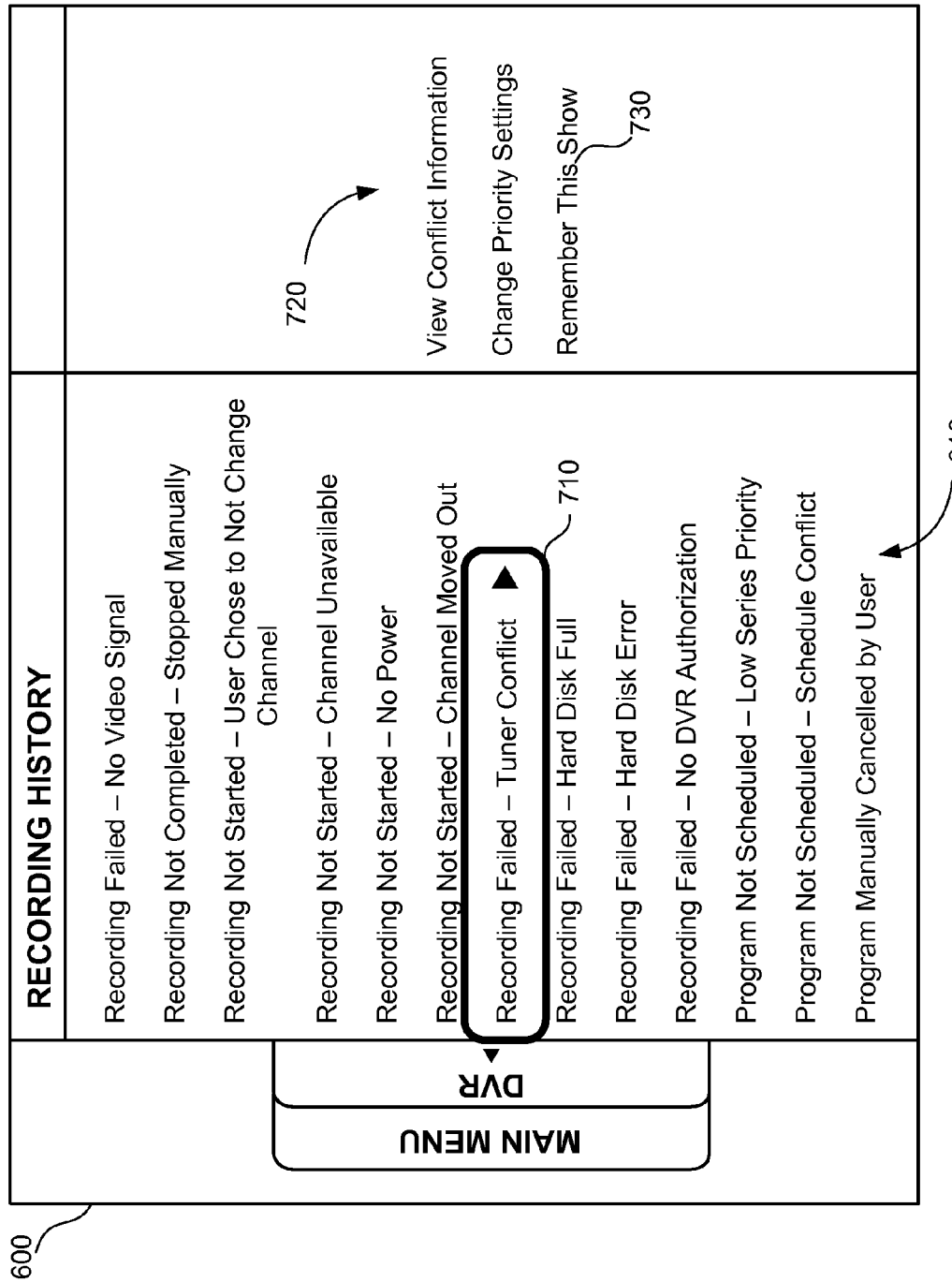
FIG. 7 illustrates the GUI of FIG. 6 with an exemplary list of contextual options displayed therein.

As mentioned, media recording facility 360 may be configured to provide a user selectable option associated with the designation feature within a context of a recording history log. FIG. 7 illustrates the GUI 600 of FIG. 6 with a selector 710 displayed therein. Selector 710 may be utilized by a user to select one of the entries 620 in recording history log 610. In response to a selection of an entry 620 in recording history log 610, media recording facility 360 may provide one or more contextual options in GUI 600. For example, FIG. 7 illustrates a list 720 of exemplary contextual options that may be displayed upon user selection of an entry 620 in recording history log 610. The options may be chosen for display based on the selected entry 620. For example, an entry 620 associated with a recording failure may be associated with a particular set of contextual options. In the illustrated example, the selected entry 620 is associated with a recording failure, and the list 720 of contextual options includes a "remember this show" option 730. Option 730 may become an available option provided by media recording facility 360 in response to recognition of the failed recording associated with the selected entry 620. Option 730 may be configured to facilitate invocation of the designation feature described above in association with the media content instance associated with the failed recording corresponding to the selected entry 620. A user may select option 730 in GUI 600 to invoke the above-described designation feature. Media recording facility 360 may detect the user selection and perform, in response to the user selection, the designation feature as described above for the media content instance associated with the selected entry 620.

An example of a particular use of the above-described designation feature will now be described. A user associated with processing subsystem 110 may instruct processing subsystem 110 to schedule a recording of a first media content instance (e.g., an episode of a show referred to as "Lost"), a recording of a second media content instance (e.g., an episode of a show referred to as "Fringe"), and a recording of a third media content instance (e.g., an episode of a show referred to as "Eureka"). Media recording facility 360 may schedule respective recordings for the first, second, and second media content instances. This may be accomplished in any suitable way, including by adding identifiers representative of the first, second, and third media content instances to a recording schedule.

The recordings may be scheduled to be performed during scheduled transmissions of the first, second, and third media content instances. The transmissions may be scheduled for certain time slots and content channels. For purposes of this example, the recordings may be scheduled to be performed on three different content channels but during a common time slot. For example, each of the recordings may be scheduled to be performed from 8:00 PM to 9:00 PM on the same date. Where resources of processing subsystem 110 are insufficient to support concurrent recording of the three media content instances, a recording conflict exists and at least one of the scheduled recordings may not be recorded as scheduled.

When a recording conflict exists, the scheduled recordings causing the conflict may be prioritized to determine which of the scheduled recordings will not be performed as scheduled. Media recording facility 360 may be configured to prioritize conflicting recordings based on a predefined prioritization heuristic. The prioritization heuristic may be defined as may suit a particular implementation. In certain embodiments, media recording facility 360 may provide at least one tool configured to facilitate a user of processing subsystem 110 customizing one or more settings of the prioritization heuristic.

In certain embodiments, the prioritization heuristic may be configured to prioritize earlier scheduled recordings over later scheduled recordings. For example, if the recordings of the first, second, and third media content instances were scheduled in that order and processing subsystem 110 included resources for concurrently recording no more than two media content instances, media recording facility 360 may choose not to record the third media content instance as scheduled based on the prioritization heuristic. In other words, the scheduled recording of the third media content instance is "bumped" or otherwise canceled. This will result in a recording failure, which in the present example is a failure to record the third media content instance.

In association with the failure to record the third media content instance, media recording facility 360 may recognize the failure and invoke the designation feature described above, which may include media recording facility 360 identifying the third media content instance as failing to be recorded, looking for an opportunity to record the same media content instance at another time, and potentially rescheduling the recording of the third media content instance for another time associated with a future scheduled transmission of the third media content instance.

Figure 8:
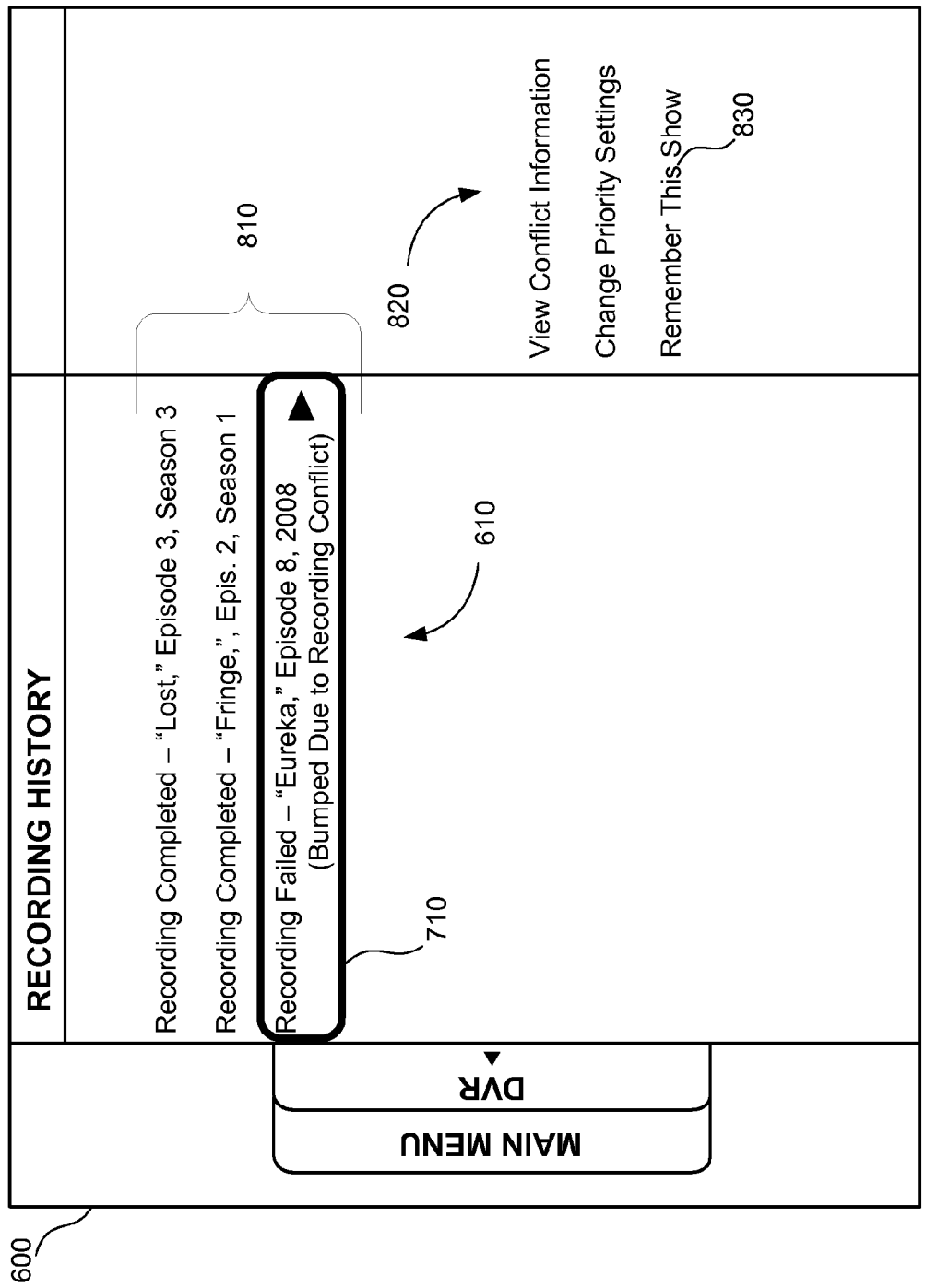
FIG. 8 illustrates the GUI of FIG. 6 with another exemplary recording history log displayed therein.

As described above, the designation feature may be invoked by media recording facility 360 automatically or in response to a user providing input directing media recording facility 360 to invoke the feature. An example of a user selecting to invoke the designation feature in association with the failure to record the third media content instance will now be described. FIG. 8 illustrates the GUI 600 of FIG. 6 with another set of entries 810 included in recording history log 610. As shown, the entries 810 may indicate successful recordings of the first and second media content instances. One of the entries 810 may further indicate a failure to record the third media content instance. A user of processing subsystem 110 may observe in the recording history log 610 that the third media content instance was not recorded and may utilize selector 710 to select the entry corresponding with the recording failure, which selection may launch a display of a list 820 of contextual options associated with the recording failure. As shown in FIG. 8, the list of contextual options may include a "remember this show" option 830. The user may select option 830 to cause media recording facility 360 to invoke the designation feature and thereby designate to consider the third media content instance for at least one future potential recording opportunity.

With the designation feature invoked for the third media content instance, media recording facility 360 may search for future scheduled transmissions of the third media content instance that will be available to processing subsystem 110. If media recording facility 360 finds such a future scheduled transmission of the third media content instance, the recording of the third media content instance may be rescheduled for the future transmission. Before scheduling or attempting to schedule the third media content instance for recording during the future scheduled transmission of the third media content instance, media recording facility 360 may check for any other scheduled recordings that may overlap with the scheduled transmission time and determine whether sufficient resources will be available to record the third media content instance. If sufficient resources will not be available, or are not available at recording time, a recording conflict may exist. In certain embodiments, the prioritization heuristic described above may be used to resolve the recording conflict.

While the above example illustrates a user selecting to invoke the designation feature from a recording history log context, this is illustrative only. Media recording facility 360 may be configured to facilitate invocation of the designation feature for a media content instance in a variety of ways and from various GUI views. For example, media recording facility 360 may be configured to invoke the designation feature from a program guide view such as when a record button on input device 140 is actuated while a media content instance that failed to be recorded is highlighted in a program guide view or when a media content instance information view is displayed in a program guide view.

Figure 9:
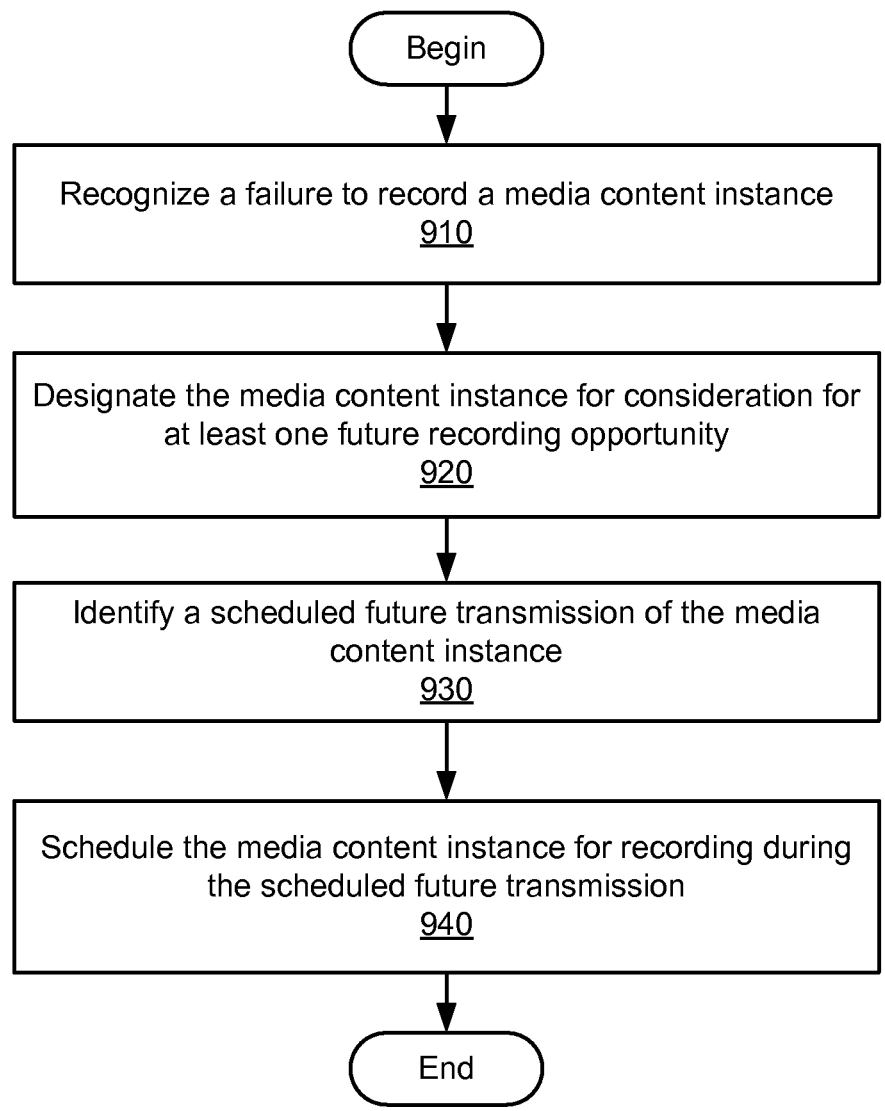
FIG. 9 illustrates an exemplary method of handling a failed media content recording.

FIG. 9 illustrates an exemplary method of handling a failed recording event. While FIG. 9 illustrates exemplary steps according to one embodiment, other embodiments may omit, add to, reorder, and/or modify any of the steps shown in FIG. 9. In certain embodiments, one or more of the steps shown in FIG. 9 are performed by media content processing subsystem 110.

In step 910, a failure to record a media content instance is recognized. Step 910 may be performed in any of the ways described above, including media recording facility 360 of processing subsystem 110 recognizing the recording failure.

In step 920, the media content instance is designated for consideration for at least one future recording opportunity. Step 920 may be performed in any of the ways described above, including media recording facility 360 of processing subsystem 110 performing the designation feature described above for the media content instance. In some examples, step 920 may be periodically repeated until a future recording opportunity is found.

In step 930, a scheduled future transmission of the media content instance is identified. Step 930 may be performed in any of the ways described above, including media recording facility 360 of processing subsystem 110 searching program guide data to find and identify the scheduled future transmission.

In step 940, the media content instance is scheduled for recording during the scheduled future transmission. Step 940 may be performed in any of the ways described above, including media recording facility 360 of processing subsystem 110 adding data representative of the media content instance and scheduled future transmission to a recording schedule.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method comprising:
recognizing, by a media content processing subsystem, a failure to record a video based media content instance in response to at least a portion of said video based media content instance not being successfully recorded;
identifying, by said media content processing subsystem from a plurality of recording failure event types, a recording failure event type associated with said failure to record said video based media content instance;
identifying, by said media content processing subsystem, whether said identified recording failure event type is associated with one of a user-caused recording failure and a system-caused recording failure;
identifying, by said media content processing subsystem, at least one user defined action associated with said identified recording failure event type by accessing a previously stored user selection of an option indicating said at least one action is to be performed in response to at least one of a user-based recording failure event type and a system-based recording failure event type;
maintaining, by said media content processing subsystem, a recording history log;
adding, by said media content processing subsystem, data representative of said failure to record said video based media content instance to said recording history log, said data representative of said failure to record said video based media content instance including both information indicative of said identified recording failure event type and information indicative of an initiator that caused said failure to record said video based media content instance;
providing, by said media content processing subsystem, said recording history log including said data representative of said failure to record said video based media content instance for display in a graphical user interface;
designating, by said media content processing subsystem in response to said recognizing of said failure to record said video based media content instance, said video based media content instance for consideration for at least one future recording opportunity in accordance with said at least one user defined action associated with said identified recording failure event type; and
searching, by said media content processing subsystem in response to said designating of said video based media content instance for consideration for at least one future recording opportunity, program guide data for said video based media content instance;
wherein:
said designating of said video based media content instance is performed automatically by said media content processing subsystem when said recording failure event type is associated with said system-caused recording failure; and
said designating of said video based media content instance is performed by said media content processing subsystem after said media content processing subsystem receives a confirmation from a user to designate said video based media content instance for consideration for said at least one future recording opportunity when said recording failure event type is associated with said user-caused recording failure.

2. The method of claim 1, wherein said searching comprises periodically searching said program guide data at least until said scheduled future transmission of said video based media content instance is identified.

3. The method of claim 1, further comprising:
receiving, by said media content processing subsystem, said program guide data;
receiving, by said media content processing subsystem, at least one update to said program guide data; and
searching, by said media content processing subsystem, said updated program guide data in response to said receipt of said at least one update.

4. The method of claim 1, further comprising:
adding, by said media content processing subsystem, at least one identifier representative of said video based media content instance to a watch list maintained by said media content processing subsystem;
failing, by said media content processing subsystem in response to said searching, to find a match for said at least one identifier in said program guide data;
receiving, by said media content processing subsystem, updated program guide data; and
while said at least one identifier is included in said watch list, searching, by said media content processing subsystem, said updated program guide data for said at least one future opportunity to record said video based media content instance.

5. The method of claim 1, wherein said identified recording failure event type is associated with said system-caused recording failure.

6. The method of claim 1, wherein said identified recording failure event type is associated with said user-caused recording failure.

7. The method of claim 1, further comprising:
recognizing, by said media content processing subsystem, another failure to record another video based media content instance;
identifying, by said media content processing subsystem, another recording failure event type associated with said another failure to record said another video based media content instance;
identifying, by said media content processing subsystem, at least another user defined action associated with said another identified recording failure event type; and
determining, by said media content processing subsystem, that the another user defined action associated with said another identified recording failure event type is to not designate said another video based media content instance for consideration for at least another future recording opportunity.

8. The method of claim 1, further comprising:
identifying, by said media content processing subsystem, a scheduled future transmission of said video based media content instance; and
scheduling, by said media content processing subsystem, said video based media content instance for recording during said scheduled future transmission.

9. The method of claim 8, further comprising checking, by said media content processing subsystem, for availability of sufficient resources for recording said video based media content instance during said scheduled future transmission before performing said scheduling of said video based media content instance for recording during said scheduled future transmission.

10. The method of claim 8, wherein said designating comprises:
adding at least one identifier representative of said video based media content instance to a watch list maintained by said media content processing subsystem.

11. The method of claim 10, further comprising removing, by said media content processing subsystem, said at least one identifier from said watch list in response to said scheduling.

12. A system comprising:
a communication facility that receives transmitted data representative of a plurality of video based media content instances in accordance with a transmission schedule; and
a media recording facility communicatively coupled to said communication facility and that
recognizes a failure to record one of said video based media content instances in response to at least a portion of said one of said video based media content instances not being successfully recorded,
identifies, from a plurality of recording failure event types, a recording failure event type associated with said failure to record said one of said video based media content instances,
identifies whether said identified recording failure event type is associated with one of a user-caused recording failure and a system-caused recording failure,
identifies at least one user defined action associated with said identified recording failure event type by accessing a previously stored user selection of an option indicating said at least one action is to be performed in response to at least one of a user-based recording failure event type and a system-based recording failure event type,
maintains a recording history log,
adds data representative of said failure to record said one of said video based media content instances to said recording history log, said data representative of said failure to record said one of said video based media content instances including both information indicative of said identified recording failure event type and information indicative of an initiator that caused said failure to record said one of said video based media content instances,
provides said recording history log including said data representative of said failure to record said one of said video based media content instances for display in a graphical user interface,
designates, in response to said recognizing of said failure to record one of said video based media content instances, said one of said video based media content instances for consideration for at least one future recording opportunity in accordance with said at least one user defined action associated with said identified recording failure event type, and
searches, in response to said designating of said one of said video based media content instances for consideration for at least one future recording opportunity, program guide data for said one of said video based media content instances;
wherein:
said designating of said one of said video based media content instances is performed automatically when said recording failure event type is associated with said system-caused recording failure; and
said designating of said one of said video based media content instances is performed after receiving a confirmation from a user to designate said one of said video based media content instances for consideration for said at least one future recording opportunity when said recording failure event type is associated with said user-caused recording failure.

13. The system of claim 12, implemented on at least one of a set-top box, a digital video recording device, and a television device.

14. The system of claim 12, further comprising a media content provider subsystem that transmits said data representative of said video based media content instances to said communication facility over a network in accordance with said transmission schedule.

15. The system of claim 12, further comprising a program guide facility that is communicatively coupled to said communication facility and that maintains program guide data descriptive of said transmission schedule;
wherein said media recording facility:
adds at least one identifier representative of said one of said video based media content instances to a watch list; and
identifies, in response to said searching of said program guide data, a scheduled future transmission of said one of said video based media content instances based on said at least one identifier.

16. The system of claim 15, wherein said media recording facility schedules said one of said video based media content instances for recording during said scheduled future transmission.

17. The system of claim 15, wherein said communication facility receives at least one update to said program guide data, and said designation of said one of said video based media content instances for consideration for said at least one future recording opportunity further comprises searching said updated program guide data in response to said receipt of said at least one update.

18. An apparatus comprising:
   at least one processor;
   a data storage facility communicatively coupled to said at least one processor; and
   a media recording application tangibly embodied on a computer-readable medium communicatively coupled to said at least one processor and that directs said at least one processor to
      schedule a recording of data representative of one of said video based media content instances to said data storage facility,
      recognize a failure to record said one of said video based media content instances as scheduled in response to at least a portion of said one of said video based media content instances not being successfully recorded,
      identify, from a plurality of recording failure event types, a recording failure event type associated with said failure to record said one of said video based media content instance,
      identify whether said identified recording failure event type is associated with one of a user-caused recording failure and a system-caused recording failure,
      identify at least one user defined action associated with said identified recording failure event type by accessing a previously stored user selection of an option indicating said at least one action is to be performed in response to at least one of a user-based recording failure event type and a system-based recording failure event type,
      maintain a recording history log,
      add data representative of said failure to record said one of said video based media content instances to said recording history log, said data representative of said failure to record said one of said video based media content instances including both information indicative of said identified recording failure event type and information indicative of an initiator that caused said failure to record said one of said video based media content instances,
      provide said recording history log including said data representative of said failure to record said one of said video based media content instances for display in a graphical user interface,
      designate, in response to said recognizing of said failure to record said one of said video based media content instances, said one of said video based media content instances for consideration for at least one future recording opportunity in accordance with said at least one user defined action associated with said identified recording failure event type, and
      search, in response to said designating of said one of said video based media content instances for consideration for at least one future recording opportunity, program guide data for said one of said video based media content instances;
   wherein:
      said designating of said one of said video based media content instances is performed automatically when said recording failure event type is associated with said system-caused recording failure; and
      said designating of said one of said video based media content instance is performed after said media recording application receives a confirmation from a user to designate said one of said video based media content instance for consideration for said at least one future recording opportunity when said recording failure event type is associated with said user-caused recording failure.

19. The apparatus of claim 18, wherein said media recording application directs said at least one processor to:
   add at least one identifier representative of said one of said video based media content instances to a watch list; and
   identify, in response to said searching of said program guide data, a scheduled future transmission of said one of said video based media content instances based on said at least one identifier.

20. The apparatus of claim 19, wherein said media recording application directs said at least one processor to schedule said one of said video based media content instances for recording during said scheduled future transmission.

* * * * *